(12) United States Patent
Li et al.

(10) Patent No.: US 8,965,325 B2
(45) Date of Patent: Feb. 24, 2015

(54) ENABLING EMERGENCY CALL BACK TO A USER DEVICE

(75) Inventors: Mingxing Li, San Jose, CA (US); Jeffrey R. Evans, Lovettsville, VA (US); John H. Wurster, Basking Ridge, NJ (US); Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 466 days.

(21) Appl. No.: 12/952,771

(22) Filed: Nov. 23, 2010

(65) Prior Publication Data

US 2012/0129482 A1     May 24, 2012

(51) Int. Cl.
| | |
|---|---|
| *H04M 11/04* | (2006.01) |
| *H04M 3/42* | (2006.01) |
| *H04M 3/51* | (2006.01) |
| *H04M 3/54* | (2006.01) |
| *H04M 7/00* | (2006.01) |

(52) U.S. Cl.
CPC ........ *H04M 3/42195* (2013.01); *H04M 3/5116* (2013.01); *H04M 3/54* (2013.01); *H04M 7/006* (2013.01); *H04M 2203/2005* (2013.01)
USPC .................... 455/404.1; 455/404.2; 455/560; 455/445; 379/37; 379/45

(58) Field of Classification Search
USPC ......... 455/404.1, 404.2, 445, 560; 379/37, 45
See application file for complete search history.

(56) References Cited

U.S. PATENT DOCUMENTS

| | | | | |
|---|---|---|---|---|
| 5,864,755 | A * | 1/1999 | King et al. ................. | 455/404.1 |
| 7,127,044 | B1 * | 10/2006 | Becker et al. .................... | 379/45 |
| 8,244,204 | B1 * | 8/2012 | Chen et al. ................. | 455/404.1 |
| 2008/0310599 | A1 * | 12/2008 | Purnadi et al. .................. | 379/37 |
| 2011/0244824 | A1 * | 10/2011 | Hursey et al. .............. | 455/404.1 |

\* cited by examiner

*Primary Examiner* — Marcos Torres

(57) ABSTRACT

Emergency call backs may be placed to a user device in a manner that bypasses certain features (e.g., call forwarding) that may be enabled by the device. A method may include receiving an emergency call from a user device; and creating, in response to the emergency call, an emergency session associated with the user device, where the creating includes forwarding the call to a public safety access point (PSAP) server that handles emergency calls. The method may further include receiving a call, such as an emergency call back call, destined for the user device; determining that the emergency session has not expired when an elapse time associated with the emergency session is less than a threshold; and forwarding, to the user device, the call, as a return call from the PSAP server, based on the determination that the emergency session has not expired.

18 Claims, 5 Drawing Sheets

| DEVICE ID 305 | RECEIVED TIME 310 | SESSION TIME 315 | PSAP THRESHOLD 320 |
|---|---|---|---|
| MDN/MSISDN/IMSI | 12:30:05 | 00:04:35 | 00:05:00 |
| IP ADDRESS / MAC ADDRESS | 12:31:30 | 00:05:10 | 00:05:00 |
| ... | ... | ... | ... |

FIG. 3

ENABLING EMERGENCY CALL BACK TO A USER DEVICE

BACKGROUND INFORMATION

When an emergency telephone call (e.g., a 911 call) is placed by a user device, such as a wireless mobile device, a service provider network usually routes the call to a public safety access point (PSAP) that handles emergency telephone calls and/or permits a user, of the user device, to communicate with a dispatcher associated with the PSAP. If the emergency call to the PSAP is dropped and/or interrupted, or if the PSAP is busy and/or otherwise unable to handle the call, the PSAP may place information associated with the emergency call in a queue and/or may, at a later point in time, place a return call (e.g., a PSAP call back) to the user device.

Unfortunately, the PSAP call back may not be routed by the service provider network, to the user device, if the user device has activated certain call handling features, such as "do not disturb," "call forwarding," "simultaneous ring," etc. When one or more of the call handling features are activated by the user device, the service provider network may, instead, route the PSAP call back to a voicemail box associated with the user device (e.g., when the do not disturb feature is activated) and/or to another user device (e.g., when the call forwarding feature and/or the simultaneous ring feature is activated).

BRIEF DESCRIPTION OF THE DRAWINGS

FIG. 3 is a diagram of an example public safety access point (PSAP) call session data structure used to identify and/or route a PSAP call back according to an implementation described herein;

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

An implementation described herein may include systems and/or methods that enable a return call, placed by a public safety access point (PSAP) server in response to an emergency call (e.g., a 911 call, a 999 call, a 112 call, etc. depending on the country) received from a user device, to be routed to the user device. A PSAP application may determine that certain features have been activated and/or enabled by the user device that prohibit calls, destined for the user device, from being routed to the user device (e.g., a do not disturb feature, a call forwarding feature, etc.) and/or that cause the calls to be routed to another user device (e.g., the call forwarding feature, a simultaneous ring feature, etc.). The PSAP application may, when handling the return call, cause the features to be bypassed, temporarily disabled, and/or temporarily deactivated, which may permit the PSAP application to route the call to the user device from which the emergency call was placed.

Figure 1:
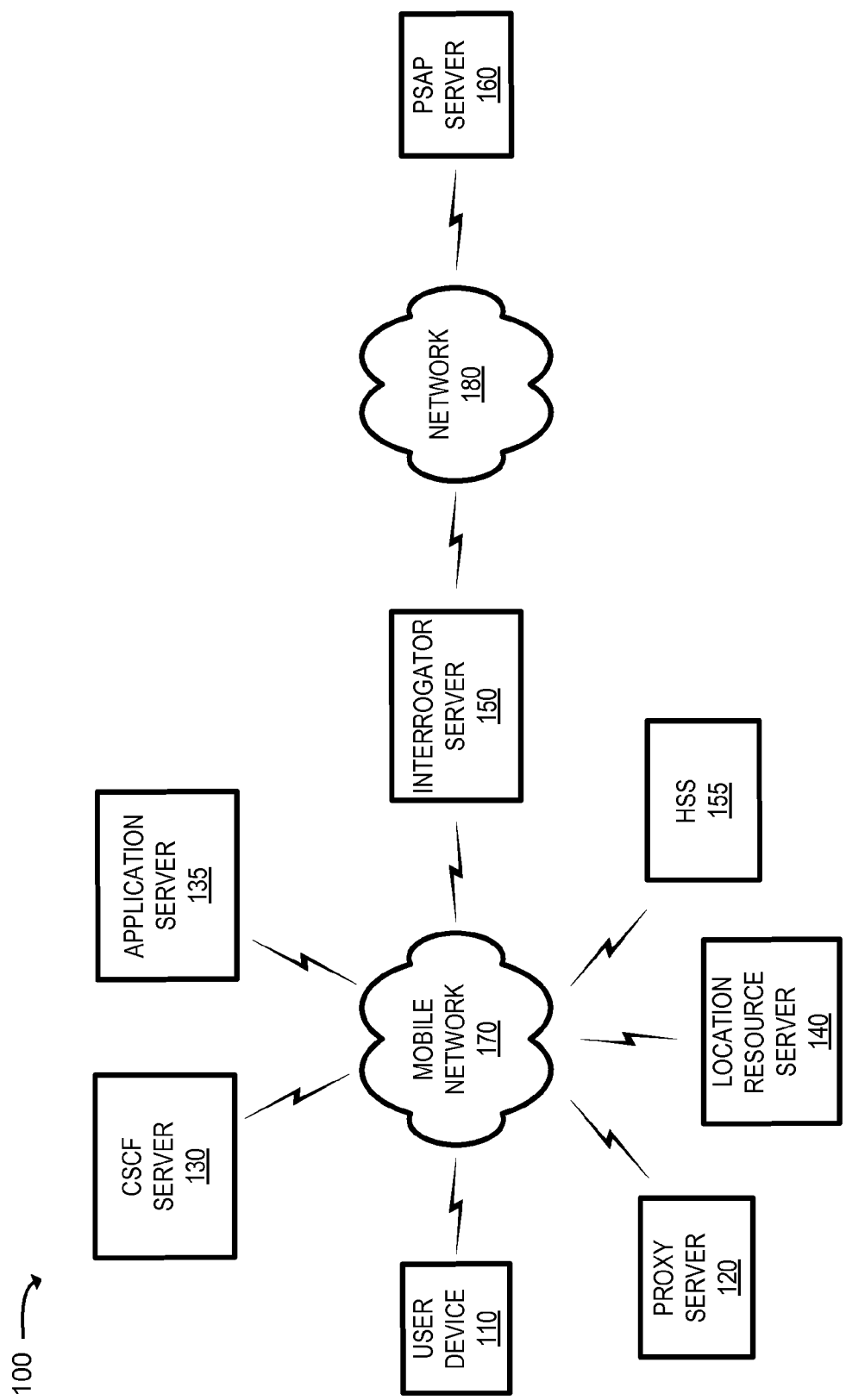
FIG. 1 is a diagram of an example environment in which system and/or methods, described herein, may be implemented.

FIG. 1 is a diagram of an example environment 100 in which system and/or methods, described herein, may be implemented. As shown in FIG. 1, environment 100 may include a user device 110, a proxy server 120, a call session control function (CSCF) server 130, an application server 135, a location resource server 140, an interrogator server 150, a home subscriber server (HSS) 155, a public safety access point (PSAP) server 160, a mobile provider network 170, and a network 180. In practice, environment 100 may include additional devices and/or networks, fewer devices and/or networks, different devices and/or networks, or differently arranged devices and/or networks than are shown in FIG. 1. Additionally, or alternatively, one or more devices and/or networks of environment 100 may perform the tasks described as being performed by one or more other devices and/or networks of environment 100. For example, proxy server 120, CSCF server 130, location resource server 140, and/or interrogator server 150 may be combined into a single device.

User device 110 may include any computation or communication device, such as a wireless mobile communication device, that is capable of communicating with mobile network 170. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a camera, a personal gaming system, or another type of computation or communication device.

Proxy Server 120 may include one or more server devices, or other types of computation or communication devices, that gather, process, search, store, and/or provide information. In an example implementation, proxy server 120 may be a proxy-CSCF (P-CSCF) server. Proxy server 120 may communicate with user device 110 on behalf of CSCF server 130 and/or mobile network 170. For example, proxy server 120 may authenticate user device 110 and may determine to which CSCF server 130 a call from user device 110 is to be routed. In the event that proxy server 120 cannot authenticate user device 110, proxy server 120 may not route a call to CSCF server 130. If however, the call is an emergency call, proxy server 120 may route the call to an emergency-CSCF server (not shown in FIG. 1), which may route the emergency call to PSAP server 160. Proxy server 120 may query user device 110 to determine a location associated with user device 110, which proxy server 120 may use to route a call to a PSAP server 160 and/or CSCF server 130 associated with the location.

CSCF server 130 may include one or more server devices, or other types of computation or communication devices, that gather, process, search, store, and/or provide information. In an example implementation, CSCF server 130 may be a serving-CSCF server. CSCF server 130 may communicate via mobile network 170 and/or network 180 and may process and/or route calls to and from user device 110. In one example implementation, CSCF server 130 may store software or logic associated with a PSAP application that CSCF server 130 may use to handle calls received from user device 110 and/or network 180 that are destined for user device 110. The PSAP application may, for example, route a call received from user device 110 (e.g., via proxy server 120) and may route the call to a destination and/or perform operations associated with monitoring minutes and/or billing information associated with the call. In another example, the PSAP application may route calls to user device 110 and may communicate with application server 135 in order for certain features (e.g., do not disturb, call forwarding, simultaneous ring, etc.) enabled by user device 110, to be applied to calls destined for user device 110. CSCF server 130 may receive an emergency call from user device 110, via proxy server 120, and the PSAP application may start a session timer associated with the emergency call received from user device 110. The PSAP application may query location resource server 140 in order to identify to which PSAP server 160 the emergency call is to be routed, based on location information, associated with user device 110, received from proxy server 120. Based on results obtained as a result of the query, CSCF server 130 may route the emergency call to the identified PSAP server 160.

CSCF server 130 may receive a call destined for user device 110 from interrogator server 150 and may determine whether an elapsed time since the emergency call was received from user device 110 is less than a threshold. Based on a determination that the elapsed time is less than the threshold, the PSAP application may process the call as a return call (e.g., a PSAP call back) associated with the emergency call. Based on the determination that the received call is a PSAP call back, the PSAP application may cause certain features to be bypassed, temporarily deactivated, and/or temporarily disabled (e.g., by not forwarding the call to and/or querying application server 135). The PSAP application may forward the call to user device 110 via proxy server 120.

Application server 135, may include one or more server devices, or other types of computation or communication devices, that gather, process, search, store, and/or provide information. Application server 135, may for example, process received calls based on features that are enabled and/or activated by user device 110. Application server 135 may, for example, cause a call, intended for user device 110, to be forwarded to another user device 110 based on a call forwarding feature, enabled by user device 110, which specifies that calls are to be forwarded to the other user device 110. In another example, application server 135 may cause a call to be forwarded to a voicemail box associated with user device 110 if another feature (e.g., do not disturb) has been enabled by user device 110. In yet another example, application server 135 may forward a call to user device 110 and/or another user device 110 when a further feature (e.g., simultaneous ring) has been enabled by user device.

Location resource server 140, may include one or more server devices, or other types of computation or communication devices, that gather, process, search, store, and/or provide information. In an example implementation, location resource server 140 may be included with CSCF server 130 as a single device. Location resource server 140 may identify to which PSAP server 160 an emergency call is to be routed based on location information associated with user device 110 from which the call was placed. Location resource server 140 may identify a route via which the call is to be sent from CSCF server 130 to the identified PSAP server 160.

Interrogator server 150 may include one or more server devices, or other types of computation or communication devices, that gather, process, search, store, and/or provide information. In an example implementation, interrogator server 150 may be an interrogator-CSCF server. Interrogator server 150 may receive a call, destined for user device 110, from another network (e.g., network 180) and may determine to which CSCF server 130 the call is to be routed. In another example, interrogator server 150 may receive the call and may communicate with HSS 155 to identify to which CSCF server 130 the call is to be routed. The determination may be based on information associated with user device 110 (e.g., a mobile directory number (MDN), an IP address, etc.).

HSS 155 may include one or more server devices, or other types of computation or communication devices, that gather, process, search, store, and/or provide information. For example, HSS 155 may store subscription information associated with user device 110, information associated with a user of user device 110, and/or location information associated with user device 110. In one example, HSS 155 may receive a query, from interrogator server 150, to identify a CSCF server 130 to which a call destined for user device 110 is to be sent. HSS 155 may identify a particular CSCF server 130 by comparing information associated with user device 110 received in the query to information associated with user device 110 stored in a memory associated with HSS 155. HSS 155 may retrieve, from the memory, an identifier associated with the particular CSCF server 130 that corresponds to the stored information associated with user device 110.

PSAP server 160 may include one or more server devices, or other types of computation or communication devices, that gather, process, search, store, and/or provide information For example, PSAP server 160 may process emergency calls received from user devices 110. PSAP server 160 may enable a user of user device 110 to communicate with a dispatcher associated with PSAP server 160. PSAP server 160 may place information associated with the emergency call in a queue if no dispatchers are available to take the emergency call. Alternatively, or additionally, at a later point in time (e.g., when the information associated with the emergency call has reached the front of the queue and/or when a dispatcher becomes available), PSAP server 160 may place a return call (e.g., an emergency PSAP call back), to user device 110 in response to the emergency call. PSAP server 160 may, for example, place the call to user device 110 using the information associated with the emergency call (e.g., that includes information associated with user device 110, such as an MDN, an IP address, a MAC address, etc.).

Mobile network 170 may include one or more wireless networks. For example, mobile network 170 may include a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks.

Network 180 may include one or more wired and/or wireless networks. For example, network 180 may include a cellular network, a public land mobile network (PLMN), a second generation (2G) network, a third generation (3G) network, a fourth generation (4G) network (e.g., a long term evolution (LTE) network), a fifth generation (5G) network, and/or another network. Additionally, or alternatively, network 180 may include a wide area network (WAN), a metropolitan network (MAN), a telephone network (e.g., the Public Switched Telephone Network (PSTN)), an ad hoc network, an intranet, the Internet, a fiber optic-based network (e.g., a FiOS network), and/or a combination of these or other types of networks.

Figure 2:
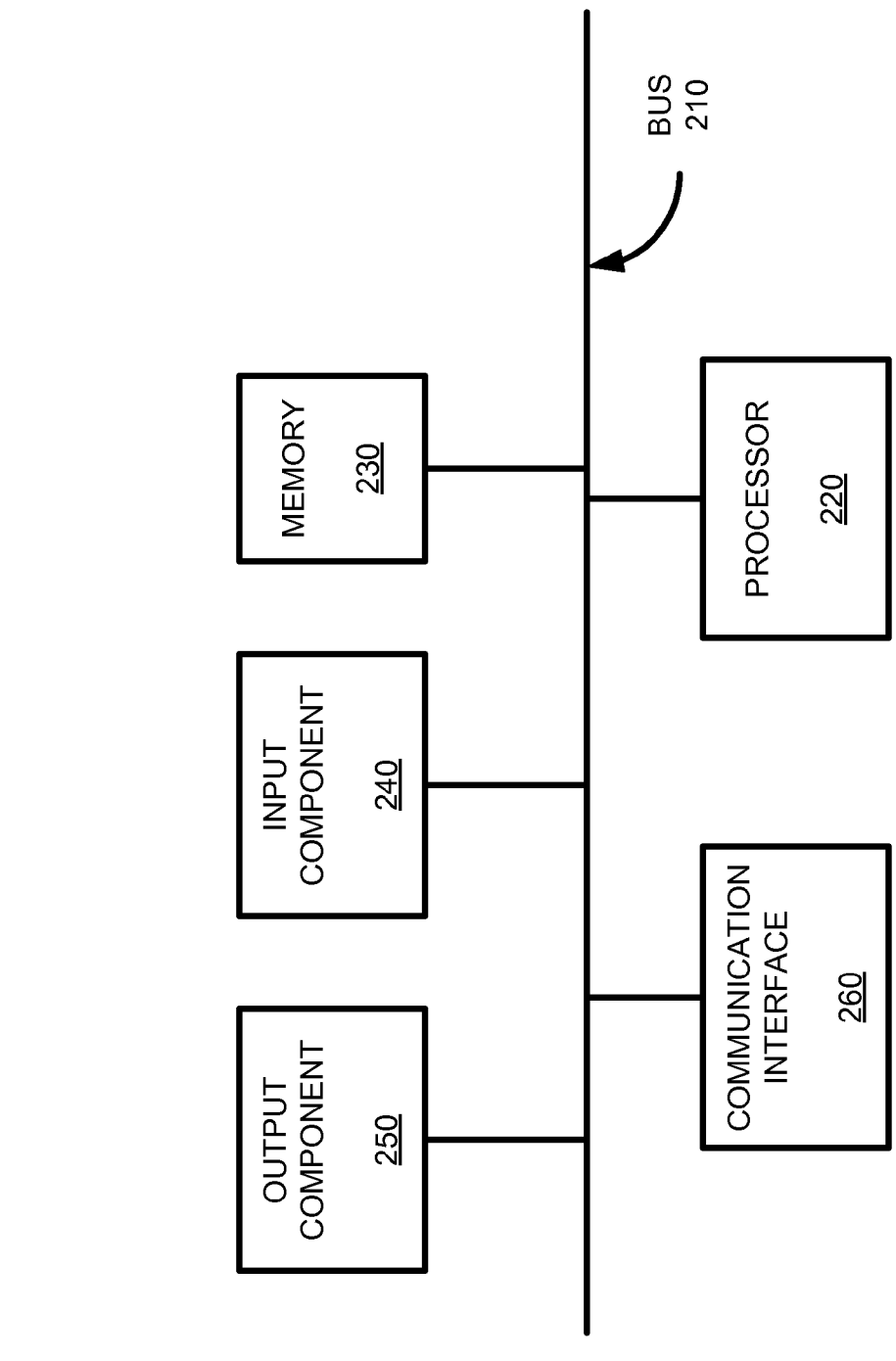
FIG. 2 is a diagram illustrating example components of one or more devices as illustrated in FIG. 1.

FIG. 2 is a diagram illustrating example components of device 200 that may correspond to user device 110, proxy server 120, CSCF server 130, application server 135, location resource server 140, interrogator server 150, HSS 155, and/or PSAP server 160. Each of user device 110, proxy server 120, CSCF server 130, application server 135, location resource server 140, interrogator server 150, HSS 155, and/or PSAP server 160 may include one or more devices 200. As shown in FIG. 2, device 200 may include a bus 210, a processor 220, a memory 230, an input component 240, an output component 250, and a communication interface 260.

Although FIG. 2 shows example components of device 200, in other implementations, device 200 may contain fewer components, different components, additional components, or differently arranged components than depicted in FIG. 2. Additionally, or alternatively, one or more components of device 200 may perform one or more tasks described as being performed by one or more other components of device 200.

Bus 210 may include a path that permits communication among the components of device 200. Processor 220 may include one or more processors, microprocessors, or processing logic (e.g., application specific integrated circuits (ASICs) or field programmable gate arrays (FPGAs)) that may interpret and execute instructions. Memory 230 may include a random access memory (RAM) device or another type of dynamic storage device that may store information and instructions for execution by processor 220, a read only memory (ROM) device or another type of static storage device that may store static information and instructions for use by processor 220, a magnetic and/or optical recording memory device and its corresponding drive, and/or a removable form of memory, such as a flash memory.

Input component 240 may include a mechanism that permits an operator to input information to device 200, such as a keypad, a button, a pen, a touch screen, voice recognition and/or biometric mechanisms, etc. Output component 250 may include a mechanism that outputs information to the operator, including a display, one or more light emitting diodes (LEDs), a speaker, etc.

Communication interface 260 may include any transceiver-like mechanism that enables device 200 to communicate with other devices and/or networks, such as for communicating with mobile network 170 and/or network 180. For example, communication interface 260 may include a modem, a network interface card, or a wireless interface card.

As will be described in detail below, device 200 may perform certain operations. Device 200 may perform these operations in response to processor 220 executing software instructions contained in a computer-readable medium, such as memory 230. A computer-readable medium may be defined as one or more logical or physical memory devices. A logical memory device may include space within a single physical memory device or spread across multiple physical memory devices.

The software instructions may be read into memory 230 from another computer-readable medium, or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

FIG. 3 is a diagram of example PSAP call session data structure 300 (hereinafter referred to as "PSAP data structure 300") used to identify and/or route a PSAP call back according to an implementation described herein. In one implementation, one or more PSAP data structures 300 may be stored in a storage device included as part of memory 230 of CSCF server 130. In another implementation, PSAP data structure 300 may be stored in a memory associated with another device or a group of devices, separate from or including memory 230 of CSCF server 130.

As shown in FIG. 3, PSAP data structure 300 may include a device identifier (ID) field 305, a received time field 310, a session time field 315, and a PSAP threshold field 320. Although FIG. 3 shows example fields of PSAP data structure 300, in other implementations, PSAP data structure 300 may include fewer fields, different fields, additional fields, or differently arranged fields than depicted in FIG. 3. Additionally, or alternatively, one or more fields of PSAP data structure 300 may include information described as being included in one or more other fields of PSAP data structure 300.

Device ID field 305 may store information associated with a particular user device 110 from which an emergency call may be received and/or a PSAP call back may be sent. The information associated with the particular user device 110 may include a device identifier (e.g., an MDN, an international mobile subscriber identity (IMSI), an international mobile equipment identity (IMEI), an electronic serial number (ESN), a mobile identification number (MIN), a mobile subscriber integrated services digital network (MSISDN) number, a national access identifier (NAI), a media access control (MAC) address, an IP address, a uniform resource locator (URL), etc).

Received time field 310 may store a time that corresponds to a point in time that an emergency call is received from the particular user device 110. In another example implementation, received time field 310 may store a time when the emergency call is answered by and/or placed in a queue associated with PSAP server 160. In yet another example implementation, received time field 310 may store a time when the emergency call is terminated. Session time field 315 may store an elapsed time from the time stored in received time field 310 to a current time and/or a time at which a PSAP call back, associated with the emergency call, is received from PSAP server 160.

PSAP threshold field 320 may store a value associated with a time after which an emergency call session expires. For example, CSCF server 130 may receive a call destined for the particular user device 110 and the PSAP application may determine whether an entry, associated with the particular user device 110 is stored in PSAP data structure 300. If the entry is stored in PSAP data structure 300, the PSAP application may determine whether an elapse time (e.g., from session time field 315), associated with an emergency session associated with the particular user device 110, is greater than a PSAP threshold (e.g., the value stored in PSAP threshold field 320). If the elapsed time is greater than the PSAP threshold, the PSAP application may determine that the emergency session has expired and/or may handle the received call as a normal call. If the elapsed time is less than the PSAP threshold, the PSAP application may handle the received call as a PSAP call back associated with the emergency call.

PSAP threshold 320 may be set for a low time (e.g., 5 minutes) when the session timer is triggered on receipt of the emergency call. In another example, the PSAP threshold may be set for a medium time that is greater than the low time (e.g., greater than 5 minutes) when the session timer is triggered when the emergency call is answered and/or acknowledged by PSAP server 160. In yet another example, the PSAP threshold may be set for a high time that is greater than the medium time when the session timer is triggered when the emergency call is terminated (e.g., when a SIP "bye" message is received), interrupted or otherwise dropped.

For example, CSCF server 130 may receive an emergency call from user device 110 (e.g., via proxy server 120) and the PSAP application may store information associated with the particular user device 110 (e.g., a device ID such as a MDN, MSISDN, IMSI, etc.) and/or a time (e.g., 12:30:05) that the emergency call was received (e.g., as shown by ellipse 320). The PSAP application may start a session timer and may store an elapsed time (e.g., 00:04:35) regarding an emergency session associated with the particular user device 110 relative to a PSAP threshold (e.g., 05:00:00) (e.g., as shown by ellipse 320).

In another example, CSCF server 130 may receive another emergency call from another user device 110 and the PSAP application may store information associated with the other user device 110 (e.g., an address such as an IP address, a MAC address, etc.) and/or a time (e.g., 12:31:30) that the other emergency call was received (e.g., as shown by ellipse 325). The PSAP application may start a session timer and may store an elapsed time (e.g., 00:05:10) regarding an emergency session associated with the other user device 110 relative to the PSAP threshold (e.g., 05:00:00) (e.g., as shown by ellipse 325).

Figure 4:
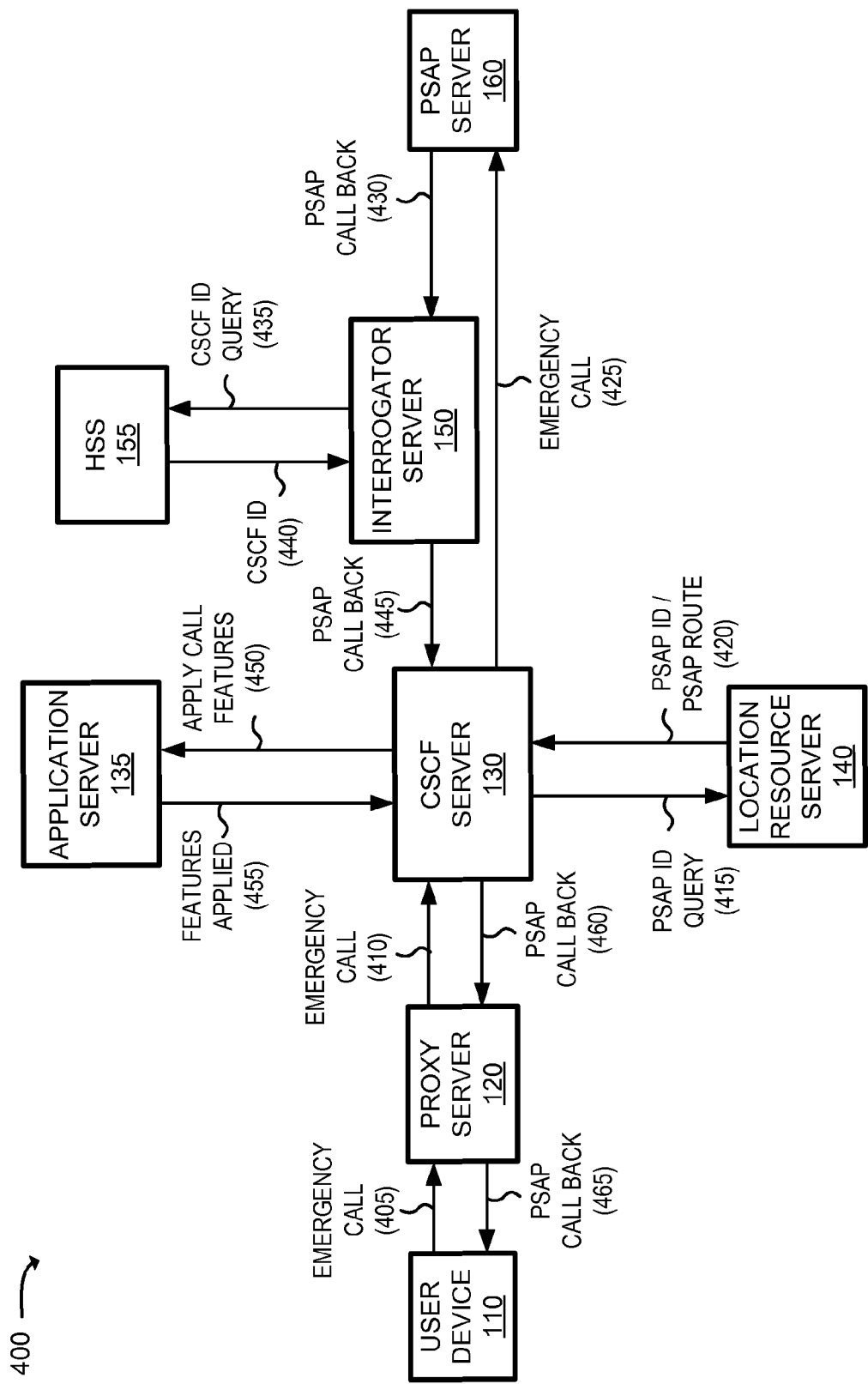
FIG. 4 is a diagram of example interactions between devices of an example portion of the environment illustrated in FIG. 1.

FIG. 4 is a diagram of example interactions between devices of an example portion 400 of the environment 100. As illustrated in FIG. 4, example environment portion 400 may include user device 110, proxy server 120, CSCF server 130, application server 135, location resource server 140, interrogation server 150, HSS 155, and PSAP server 160. User device 110, proxy server 120, CSCF server 130, application server 135, location resource server 140, interrogation server 150, HSS 155, and PSAP server 160 may include the features described above in connection with one or more of FIGS. 1 and 2.

As shown in FIG. 4, user device 110 may place, as indication 405, an emergency call. The emergency call may be based on a session initiation protocol (SIP) and may include a SIP invite message to initiate an emergency session with mobile network 170. Proxy server 120 may receive indication 405 and may verify that user device 110 is registered with mobile network 170 based on information associated with user device 110 (e.g., a device ID, an address, etc.) obtained from packet headers (e.g., SIM invite packet headers) associated with the emergency call. If proxy server 120 determines that user device 110 is not registered, then proxy server 120 may route the emergency call to an emergency CSCF server (not shown in FIG. 4), which may route the emergency call to a particular PSAP server 160. If proxy server 120 determines that user device 110 is registered, then proxy server 120 may identify to which CSCF server 130 the emergency call is to be routed based on location information associated with user device 110. Proxy server 120 may send, as indication 410, the emergency call (e.g., based on the SIP protocol) to the identified CSCF server 130 that corresponds with the location information associated with user device 110.

CSCF server 130 may receive indication 410 and may initiate an emergency session associated with user device 110. CSCF server 130 may, for example, start a session timer and/or store the information associated with user device 110 (e.g., obtained from the SIP invite), a time that the emergency call was received, an elapsed session time, and/or a session threshold in a PSAP data structure (e.g., PSAP data structure 300). CSCF server 130 may query location resource server 140, as indication 415, and obtain an identifier (e.g., PSAP ID) that identifies the PSAP server 160 that is to be sent the emergency call. Location resource server 140 may send, as indication 420, information associated with the identified PSAP server 160 and/or routing information associated with the identified PSAP server 160 to CSCF server 130, which the PSAP application may use to send the emergency call, as indication 425, to the identified PSAP server 160.

PSAP server 160 may receive indication 425 and a dispatcher may answer the emergency call, which may enable a user of user device 110 to communicate with the dispatcher associated with PSAP server 160. In another example, the emergency call may be temporarily stored in a queue associated with PSAP server 160 until the emergency call reaches the front of the queue and/or until the emergency dispatcher becomes available. When the emergency call reaches the front of the queue and/or when the dispatcher becomes available, PSAP server 160 may place a return call (e.g., a PSAP call back), as indication 430, to user device 110, via interrogator server 150, based on the information associated with user device 110 (e.g., a device identifier, an address, etc.) obtained from the emergency call.

Interrogator server 150 may receive indication 430 and may query HSS 155, as indication 435, to obtain an identifier (e.g., CSCF ID) associated with which CSCF server 130 the PSAP call back is to be sent. HSS 155 may receive indication 435 and may identify which CSCF server 130 serves user device 110 based the information associated with user device 110 obtained from the query. HSS server 155 may, for example, retrieve, from a memory associated with HSS 155, the identifier associated with CSCF server 130 that corresponds to information associated with user device 110 stored in the memory. HSS server 155 may send, as indication 440, information associated with the identified CSCF server 130 to interrogator server 150, which interrogator server 150 may use to route the PSAP call back, as indication 445, to the identified CSCF server 130.

CSCF server 130 may receive indication 445 and the PSAP application may determine whether there is an unexpired emergency session associated with user device 110. For example, the PSAP application may determine whether an entry is stored in a PSAP data structure (e.g., PSAP data structure 300) that corresponds to the information associated with user device 110 obtained from the PSAP call back. If, in one example, the PSAP application determines that there is not an entry stored in the PSAP data structure, then the PSAP application may process the PSAP call back as a normal call that is destined for user device 110.

In another example, the PSAP application may determine that an entry is stored in the PSAP data structure. The PSAP data structure may, for example, process the PSAP call back as a normal call if a session time, associated with the entry, is greater than the PSAP threshold. When processing the PSAP call back as a normal call, the PSAP application may send, as indication 450, the PSAP call back to application server 135 in order for features, enabled by user device 110, to be applied to the call. The features may include do not disturb, call forwarding, simultaneous ring, etc. Application server 135 may apply the features to the PSAP call back and may send, as indication 455, the PSAP call back (e.g., with the applied features) to CSCF server 130 as a normal call. CSCF server 130 may send the normal call to user device 110 via proxy server 120 and/or to another user device 110 (e.g., via another proxy server 120) based on information associated with the applied features (e.g., information associated with another user device, such as a device identifier, an address, etc.).

In yet another example, the PSAP application may determine that an entry is stored in the PSAP data structure and/or that an emergency session with user device 110 has not expired when the session time, associated with the entry, is less than the PSAP threshold. Based on the determination that the emergency session with user device 110 has not expired, the PSAP application may process the call as a PSAP call back. When processing the call as the PSAP call back, the PSAP application may cause certain features, enabled by user device 110, to be bypassed and/or temporarily disabled in a manner that permits the PSAP application to send, as indication 460, the PSAP call back to proxy server 120. The PSAP application may, for example, bypass application server 135 when processing the call as a PSAP call back. In another example, the PSAP application may instruct application server 135 (e.g., by sending a notification (not shown in FIG. 4) to application server 135 indicating that the call is a PSAP call back) to temporarily disable certain features enabled by user device 110 when processing the PSAP call back. In this example, application server 135 may handle the call as a PSAP call back in a manner that does not include applying certain features, enabled by user device 110, when processing the call. Proxy server 120 may receive indication 460 and may send, as indication 465, the PSAP call back to user device 110. User device 110 may receive indication 465 and the user of user device 110 may answer the PSAP call back that permits the user to communicate with the dispatcher associated with PSAP server 160.

Figure 5:
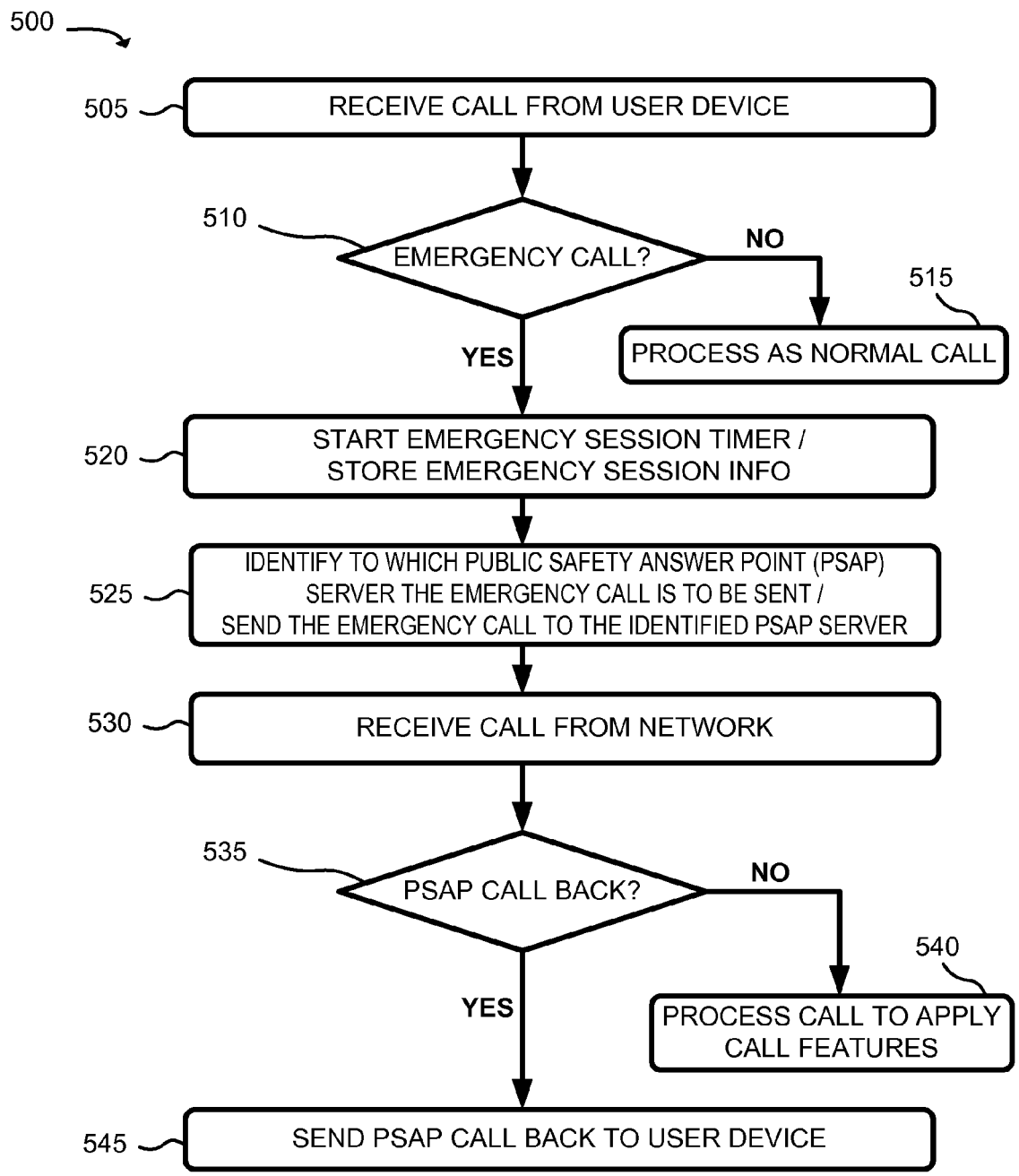
FIG. 5 is a flow diagram illustrating an example process for handling an emergency call and/or a PSAP call back, according to an implementation described herein.

FIG. 5 is a flow diagram illustrating an example process 500 for handling a PSAP call and/or a PSAP call back, according to an implementation described herein. In one implementation, process 500 may be performed by CSCF server 130. In other implementations, some or all of process 500 may be performed by another device or a group of devices separate from or including CSCF server 130.

As shown in FIG. 5, process 500 may include receiving a call from user device 110 (block 505). For example, CSCF server 130 may receive a call, via proxy server 120, from user device 110. The call may be sent using a SIP-based protocol and/or may be a SIP invite message that includes information associated with user device 110 and/or location information associated with user device 110.

As also shown in FIG. 5, if the call is not an emergency call (block 510-NO), then process 500 may include processing the call as a normal call (block 515). For example, the PSAP application may determine that the call is not an emergency call (e.g., is not a call sent as a result of a user of user device 110 dialing 911 or some other emergency number) and may send the call to a destination device based on a telephone number dialed by the user.

As further shown in FIG. 5, if the call is an emergency call (block 510-YES), then process 500 may include starting an emergency session timer and/or storing emergency session information (block 520). For example, the PSAP application may determine that the call is an emergency call as a result of the user dialing 911 or some other emergency number. Based on the determination that the call is an emergency call, the PSAP application may start an emergency session timer and/or may initiate an emergency session associated with user device 110. The PSAP application may, for example, store session information in a PSAP data structure (e.g., PSAP data structure 300 of FIG. 3) associated with user device 110. The session information may include the information associated with user device 110 (e.g., a device ID, an address, etc.), a time that the emergency call was received, an elapsed time of the session (e.g., from the time the emergency call was received to a current time), a session threshold, etc.

As further shown in FIG. 5, process 500 may include identifying the PSAP server 160 to which the emergency call is to be sent and/or sending the emergency call to the identified PSAP server 160 (block 525). For example, the PSAP application may identify the PSAP server 160 to which the emergency call is to be sent based on location information, associated with user device 110, obtained from the SIP invite message. In another example implementation, the PSAP application may query location resource server 140 to identify to PSAP server 160 and/or obtain call routing information associated the emergency call. The PSAP application may send the emergency call to the identified PSAP server 160.

The identified PSAP server 160 may receive the emergency call and, in one example, a dispatcher, associated with the identified PSAP server 160, may answer the emergency call, which may enable a user of user device 110 to communicate with the dispatcher. In another example, PSAP server 160 may temporarily place the emergency call (e.g., by temporarily storing information associated with user device 110) in a queue and/or scheduling a PSAP call back at a later point in time. The identified PSAP server 160 may send the PSAP call back, to user device 110 and at the later point in time, when the dispatcher becomes available and/or when the emergency call is at the front of the queue.

As still further shown in FIG. 5, process 500 may include receiving a call from a network (block 530). For example, CSCF server 130 may receive a call from network 170 destined for user device 110. The call may be sent using a SIP-based protocol and/or may be a SIP invite message that includes information associated with user device 110 and/or location information associated with user device 110. The PSAP application may determine whether the call is a PSAP call back by determining whether an entry, associated with user device 110, is stored in the PSAP data structure (e.g., PSAP data structure 300 of FIG. 3).

As also shown in FIG. 5, if the call is not a PSAP call back (block 535-NO), then process 500 may include processing the call to apply call features (block 540). For example, the PSAP application may determine that an entry, associated with user device 110, is not stored in the PSAP data structure and may send the call to application server 135. In another example, the PSAP application may determine that an entry, associated with user device 110, is stored in the PSAP data structure. In this example, the PSAP application may compare a session time, obtained from the data structure, to a session threshold to determine whether the emergency session has expired. The PSAP application may determine that the emergency session, associated with user device 110, has expired when the session time is greater than the session threshold and may forward the call to application server 135. Application server 135 may receive the call and may determine that certain features have been enabled by user device 110, such as call forwarding, do not disturb, simultaneous ring, and/or other features, etc. Application server 135 may process the call based on the features. In one example, application server 135 may cause the call to be sent, by CSCF server 130, to a voicemail box associated with user device 110 when the do not disturb feature is enabled. In another example, application server 135 may cause the call to be sent to another user device 110 when the call forwarding features is enabled. In yet another example, application server 135 may cause the call to be sent to user device 110 and another user device 110 when the simultaneous ring feature is enabled.

As further shown in FIG. 5, if the call is a PSAP call back (block 535-YES), then process 500 may include sending the PSAP call back to user device 110 (block 545). For example, the PSAP application may determine that an entry, associated with user device 110, is stored in the PSAP data structure. The PSAP application may, for example, compare a session time, obtained from the data structure, to a session threshold to determine whether the emergency session has expired. The PSAP application may determine that the emergency session, associated with user device 110, has not expired when the session time is less than the session threshold. Based on the determination that the emergency session has not expired, the PSAP application may determine that the call is a PSAP call back destined for user device 110. The PSAP application may forward the PSAP call back to user device 110 in a manner that does not permit features (e.g., call forwarding, do not disturb, simultaneous ring, etc.), enabled by user device 110, to interrupt and/or cause the PSAP call back to be directed to a destination other than user device 110. In one example, the PSAP application may forward the call to user device 110 in a manner that does not involve application server 135. In another example, the PSAP application may forward the call to user device 110, via application server 135 (e.g., and/or proxy server 120), in which the features are not applied to the PSAP call back.

User device 110 may receive the PSAP call back and a user of user device 110 may answer the PSAP call back. The user may communicate with a dispatcher associated with PSAP server 160 from which the PSAP call back was placed.

The foregoing description of implementations provides illustration and description, but is not intended to be exhaustive or to limit the invention to the precise form disclosed. Modifications and variations are possible in light of the above teachings or may be acquired from practice of the invention.

As another example, while series of blocks have been described with regard to FIG. 5, the order of the blocks may be modified in other implementations. Further, non-dependent blocks may be performed in parallel.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a server device, an emergency call a first user device, where a user of the first user device has enabled a feature that causes one or more calls, destined for the first user device, to be forwarded to a second user device or not to be forwarded to the first user device, wherein the emergency call is a Session Initiation Session (SIP) call;
   creating, by the server device and in response to the emergency call, an emergency session associated with the first user device, where the creating includes:
      storing, in a memory, a data item that includes a device identifier associated with the first user device, a time at which the emergency call is received from the first user device, and a threshold associated with a time after which the emergency call expires, and
      forwarding the emergency call to a public safety access point (PSAP) server that handles emergency calls;
   receiving, by the server device, a second SIP call with identification data;
   identifying the first user device as a destination to which the second call is directed by accessing the data item, by matching the identification data to the device identifier;
   determining, by the server device, that the emergency session has not expired when an elapse time associated with the emergency session is less than the threshold;
   processing, by the server device, the second SIP call as a PSAP callback by sending a notification to an application server to disable the feature that causes one or more calls, destined for the first user device, to be forwarded to a second user device or not to be forwarded to the first user device; and
   forwarding, by the server device and to the first user device, the second call, as a return call from the PSAP server, based on the disabled feature.

2. The method of claim 1, where receiving the emergency call further includes:
   obtaining location information associated with the first user device from the emergency call; and
   identifying the PSAP server, of a plurality of PSAP servers, to which the emergency call is to be sent based on the location information associated with the first user device.

3. The method of claim 1, where creating the emergency session further includes:
   identifying the first user device based on information associated with the first user device obtained from the emergency call; and
   forwarding the emergency call to the PSAP server in a manner that includes the information, associated with the first user device, that enables the PSAP server to place the second call.

4. The method of claim 1, where determining that the emergency session has not expired further includes:
   looking up, in the data item, the time at which the emergency call was received;
   determining the elapsed time of the emergency session based on a current time and the time at which the emergency call was received; and
   comparing the elapsed time to the threshold.

5. The method of claim 1, further comprising:
   receiving a third call destined for the first user device;
   determining that the emergency session has expired when another elapse time associated with the emergency session is greater than the threshold; and
   forwarding the third call to the second user device based on the feature that causes the one or more calls, destined for the first user device, to be forwarded to the second user device and the determination that the emergency session has expired.

6. The method of claim 1, further comprising:
   receiving a third call destined for a third user device;
   determining that there is no emergency session associated with the third user device; and
   processing the third call as a normal call based on the determination that there is no emergency session associated with the third user device.

7. A server device comprising:
a memory to store a data structure that includes:
a device identifier associated with a user device,
a particular time at which an emergency call was received from the user device, where the user device has enabled a feature that causes calls, destined for the user device, to be forwarded to another user device or not to be forwarded to the user device; and
a processor to:
receive a return call destined for the user device from a public safety access point (PSAP) server that received the emergency call, wherein the return call includes identification data,
access the data structure based on the identification data and the device identifier included in the data structure,
obtain the particular time from the data structure;
determine whether an emergency session, associated with the user device and the emergency call, has expired based an elapsed time and a session threshold, where the elapsed time is based on a current time and the particular time obtained from the data structure,
forward the return call, as an emergency return call, to the user device when the elapsed time is less than the session threshold, where forwarding the return call, as the emergency return call, includes causing an application server to disable the feature for the return call by sending a notification to the application server that implements the feature enabled by the user device, and
forward the return call, as a normal call, to the other user device when the elapsed time is greater than the session threshold, where forwarding the return call, as the normal call, includes forwarding the return call to the application server that implements the feature enabled by the user device.

8. The server device of claim 7, where the processor is further to:
receive, from the user device, the emergency call at the particular time, start a timer associated with an emergency session with the user device as a result of receiving the emergency call, and
store, in the data structure within the memory, emergency session information associated with the user device, where the emergency session information includes the device identifier and the particular time.

9. The server device of claim 7, where, when forwarding the return call, as the normal call, the processor is further to:
forward the return call to an application server, where the application server identifies the feature that is enabled by the user device, and
receive the return call from the application server, where the return call includes information associated with the other user device to which the return call is to be transferred.

10. The server device of claim 9, where, when forwarding the return call, as the emergency return call, the processor is further to:
bypass the forwarding of the return call to the application server.

11. The server device of claim 7, where the feature that is enabled by the user device includes at least one of a do not disturb feature, a call forwarding feature, or a simultaneous ring feature, where:
the do not disturb feature causes the return call to be forwarded to a voicemail box associated with the user device,
the call forwarding feature causes the return call to be forwarded to the other user device, and
the simultaneous ring features causes the return call to be forwarded to the user device and the other user device.

12. The server device of claim 7, where the processor is further to:
receive another emergency call from a second user device, where the second user device is not registered with a network associated with the server device, and
transfer the other emergency call to another server device, where the other server device handles emergency calls from unregistered user devices and forwards the emergency call to another PSAP server.

13. The server device of claim 7, where the processor is further to:
receive, from the user device, the emergency call at the particular time,
communicate with another server device to identify to which PSAP server, of a plurality of PSAP servers, the emergency call is to be forwarded based on location information associated with the user device obtained from the emergency call, and
forward the emergency call to the PSAP server based the communicating with the other server device.

14. A non-transitory computer-readable medium comprising instructions, when executed by one or more processors, for:
receiving an emergency call from a user device, where a user of the user device has activated a feature that redirects calls, destined for the user device, to another user device and that causes calls, destined for the user device, not to be directed to the user device;
creating in response to the emergency call, an emergency session associated with the user device, where the instructions for creating include instructions for:
storing, in a memory, a data item that includes a device identifier associated with the user device, a time at which the call is received from the user device, and a threshold associated with a time after which the emergency call expires, and
forwarding the emergency call to a public safety access point (PSAP) server that handles emergency calls;
receiving a second call with identification data;
identifying the user device as a destination to which the second call is directed by accessing the data item by matching the identification data to the device identifier;
determining that the call is a return call, associated with the emergency call based on identifying that the user device is the destination, when a period of time since the emergency call was received is less than the threshold; and
forwarding the return call to the user device via an application server that temporarily deactivates, in response to the determination that the call is a return call, the feature that redirects calls to the other user device and causes calls not to be directed to the user device.

15. The non-transitory computer-readable medium of claim 14, where the instruction for receiving the emergency call from the user device further includes instructions for:
starting a timer for an emergency session associated with the user device.

16. The non-transitory computer-readable medium of claim 15 further comprising instructions for:
receiving another call destined for another user device;
determining that the other call is not a return call, associated with another emergency call, when information associated with the other emergency call, that corresponds to the other user device, is not stored in the data item, forwarding the other call to a further user device based on a feature, associated with the other user device, that redirects calls to the further user device.

17. The non-transitory computer-readable medium of claim 14, wherein the instructions for determining that the call is the return call associated with the emergency call further includes instructions for:

determining the period of time since the emergency call was received based on the time at which the emergency call was received and a current time; and comparing the period of time since the call was received with the threshold.

18. The non-transitory computer-readable medium of claim 14, further comprising instructions for:

receiving another call destined for the user device;

determining that the call is not a return call, associated with another emergency call, when a period of time since the other emergency call was received is greater than the threshold; and forwarding the other call to the other user device based on the feature that redirects calls to the other user device.

* * * * *